United States Patent

Shapiro et al.

[11] Patent Number: 5,453,803
[45] Date of Patent: Sep. 26, 1995

[54] LOW PROFILE LIQUID CRYSTAL PROJECTOR AND METHOD OF USING SAME

[75] Inventors: Leonid Shapiro, Lakeside; David W. Kappel, San Diego, both of Calif.

[73] Assignee: Proxima Corporation, San Diego, Calif.

[21] Appl. No.: 243,062

[22] Filed: May 12, 1994

Related U.S. Application Data

[63] Continuation of Ser. No. 59,550, May 11, 1993, Pat. No. 5,321,450.

[51] Int. Cl.[6] .................................................. G03B 21/28
[52] U.S. Cl. ................................. 353/119; 353/69; 353/99
[58] Field of Search ............................. 353/119, 98, 99, 353/69, 70, DIG. 3, 122; 359/40, 48, 49

[56] References Cited

U.S. PATENT DOCUMENTS

| | | | |
|---|---|---|---|
| 4,971,436 | 11/1990 | Aoki et al. | 353/98 |
| 5,090,800 | 2/1992 | Ushiro | 353/119 |
| 5,187,510 | 2/1993 | Vogeley et al. | 353/DIG. 3 |
| 5,278,595 | 1/1994 | Nishida et al. | 353/119 |
| 5,321,450 | 6/1994 | Shapiro et al. | 353/119 |

Primary Examiner—William A. Cuchlinski, Jr.
Assistant Examiner—William C. Dowling
Attorney, Agent, or Firm—Bernard L. Kleinke; Jerry R. Potts

[57] ABSTRACT

A low profile liquid crystal projector unit, and a novel method of using it to project a liquid crystal image with substantially no keystoning effects. An optics arrangement directs high intensity light within the housing along an irregularly shaped light path extending angularly through an angularly inclined liquid crystal display panel offset by an angle λ relative to the normal axis plane of the display panel to help reduce image keystoning. An output mirror mounted above the housing is inclined angularly opposite to the liquid crystal display panel and cooperates with a lens set for projecting reflectively a liquid crystal image, formed by the display panel, onto a remote surface. The output mirror is mounted to reflect the liquid crystal image upwardly at an angle θ to the normal axis plane of the remote viewing surface, where the angle λ and the angle θ are substantially equal to help reduce image keystoning. The inventive method of using the liquid crystal projector includes passing light along an irregularly shaped light path extending angularly through the liquid crystal panel offset by an angle λ relative to the normal axis plane of the display panel and projecting reflectively upwardly at an angle θ relative to the normal axis plane of the remote viewing surface, where the angle λ and the angle θ are substantially equal.

12 Claims, 2 Drawing Sheets

LOW PROFILE LIQUID CRYSTAL PROJECTOR AND METHOD OF USING SAME

This is a Continuation of application Ser. No. 08/059,550, filed on May 11, 1993, now U.S. Pat. No. 5,321,450.

TECHNICAL FIELD

The present invention relates to a projector and method of using it, and more particularly to a low profile liquid crystal projector and method of using it.

BACKGROUND ART

Overhead projectors for large audience presentations are well known in the prior art. Such systems typically utilize transparencies for carrying the information to be viewed by the audience.

With advances in modern liquid crystal technology, such transparencies Have been replaced by full color liquid crystal display panels driven by video signal producing devices, such as personal computers. In this regard, the liquid crystal display panel is typically positioned on the stage of an overhead projector so the liquid crystal image may be projected for viewing purposes.

While the above described project system has been satisfactory for many applications, such a system is very bulky, heavy and awkward in size. Thus, such a system is not easily transportable by a business person who desires to travel from customer to customer for making sales presentations and the like.

Therefore, it would be highly desirable to have a new and improved liquid crystal projector that is compact in size and easily transportable.

Another problem with the use of an overhead projector in a business conference meeting, is that the projector generally has a very long optics path. In this regard, for example, the typical overhead projector includes a large, tall, upright housing with a raised projection lens in order to eliminate keystoning effects. Thus, such a projector unit does not have a low profile and is not very compact.

Therefore, it would be highly desirable to have a projector unit, which is compact in size and which does not produce images with undesirable substantial keystoning effects.

Other attempts have been made to develop compact overhead projectors by adapting their various parts to be foldable or collapsible. It would be highly desirable to have a new and improved compact projector, which has substantially no moving parts, is relatively inexpensive to manufacture and yet is small in size. In this regard, such a compact projector should have a very low profile to make it convenient to be transported.

DISCLOSURE OF INVENTION

Therefore, the principal object of the present invention is to provide a new and improved liquid crystal projector that is compact in size having a very low profile and that does not produce keystoned images.

Another object of the present invention is to provide such a new and improved liquid crystal projector that is reliable, not subject to mechanical failures, and that is relatively inexpensive to manufacture.

Briefly, the above and further objects of the present invention are realized by providing a low profile liquid crystal projector unit, and a novel method of using it to project a liquid crystal image with substantially no keystoning effects.

The liquid crystal projector unit generally includes a relatively large liquid crystal panel mounted angularly inclined within a projector housing in order to maintain a low profile projector configuration. A generally horizontal light or optical path within the housing is adjusted to direct the light at an offset angle through the inclined panel to reduce greatly keystoning effects.

The inventive method of using the liquid crystal projector includes positioning the low profile projector housing onto a supporting surface, such as a table, passing light along the irregularly shaped light path extending angularly through the liquid crystal panel offset by an angle $\lambda$ relative to the normal axis plane of the display panel and projecting reflectively a liquid crystal image onto a remote viewing surface. To help reduce image keystoning, the image is projected reflectively upwardly at an angle $\theta$ relative to the normal axis plane of the remote viewing surface, where the angle $\lambda$ and the angle $\theta$ are substantially equal.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
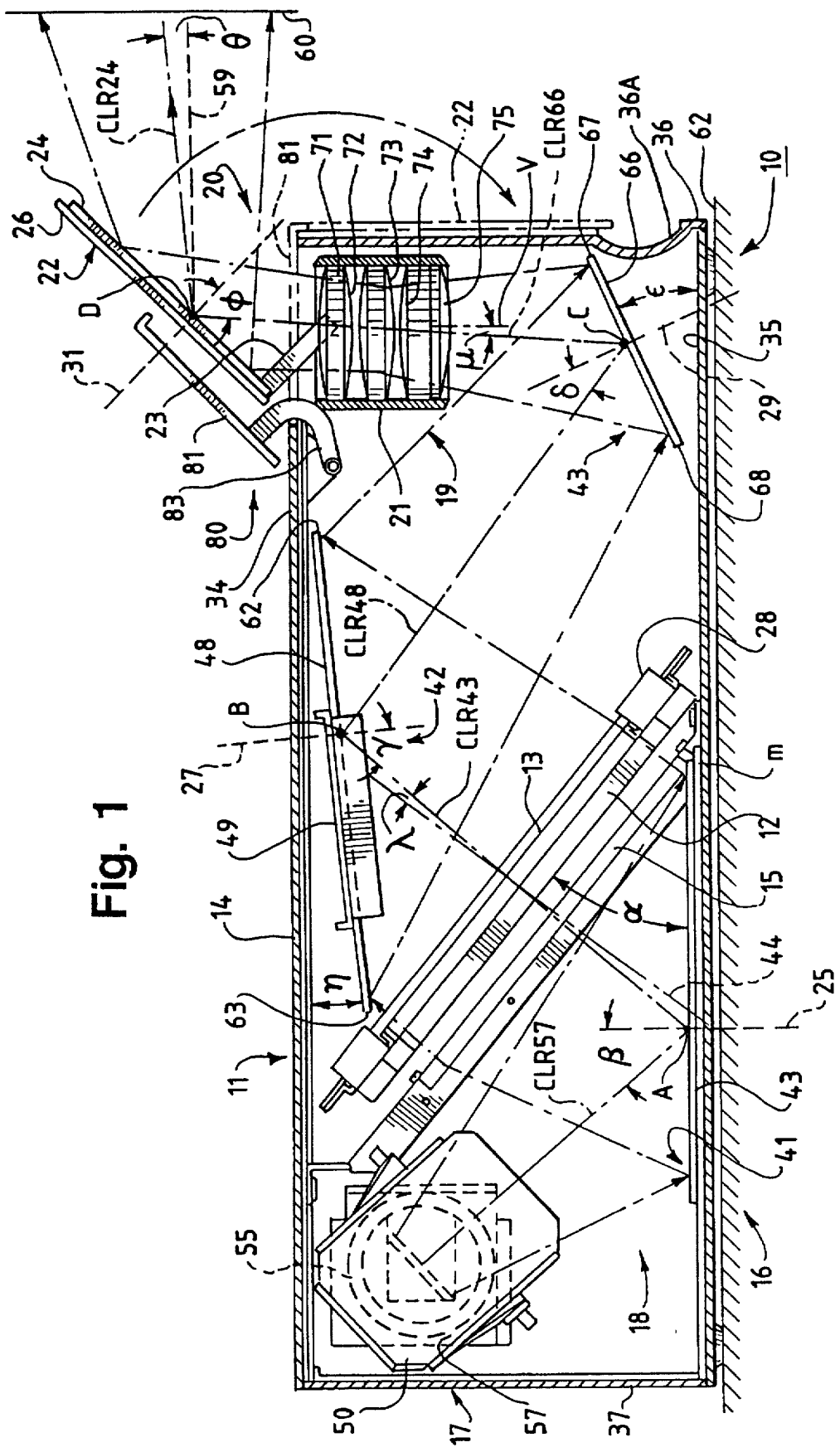
FIG. 1 is a side plan view of a liquid crystal projector unit which is constructed in accordance with the present invention.
Figure 2:
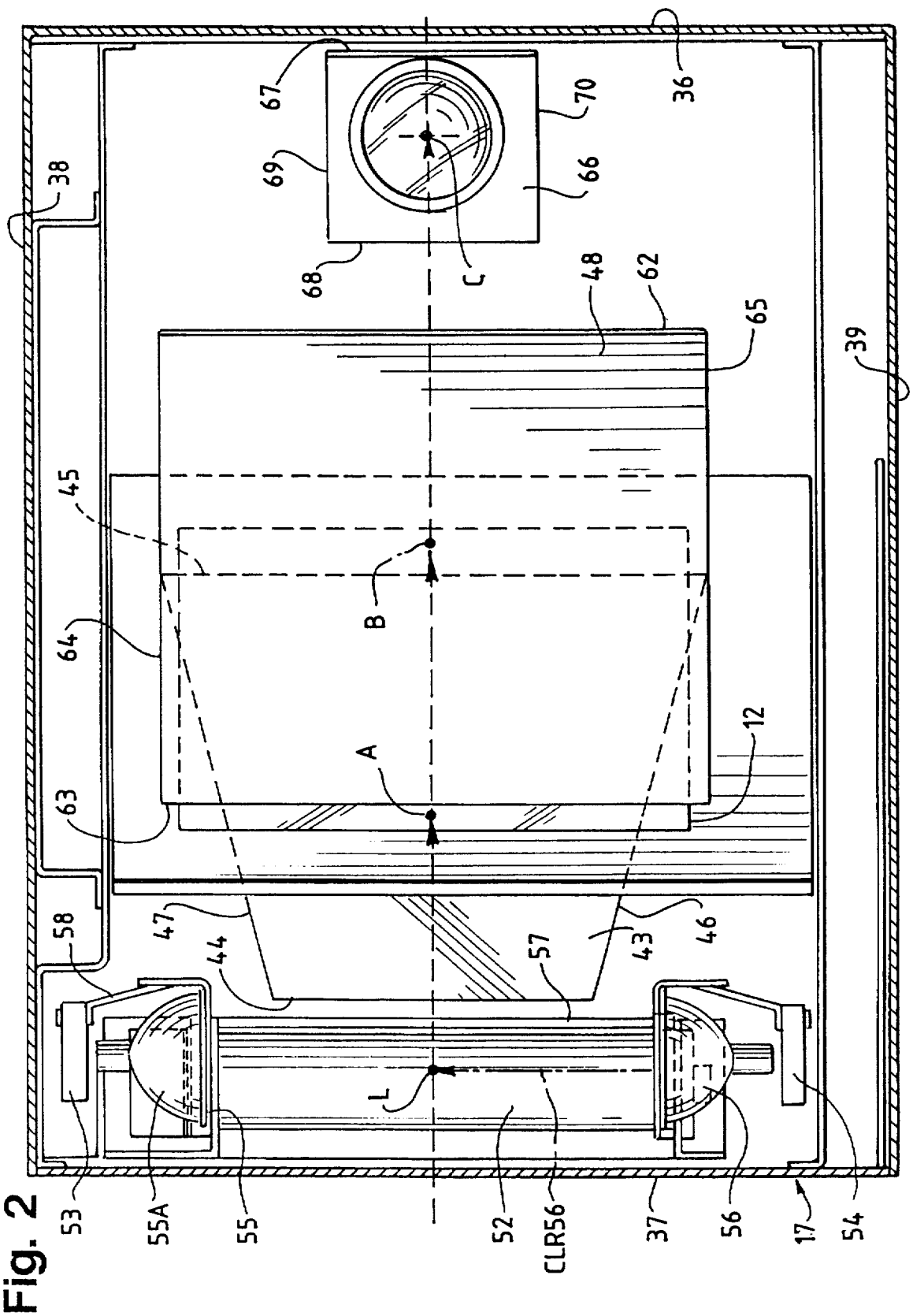
FIG. 2 is a top plan view of the liquid crystal projector unit of FIG. 1.

Referring now to the drawings, and more particularly to FIGS. 1–2, there is shown a low profile liquid crystal display projector unit 10 which is constructed in accordance with the present invention.

The projector unit 10 generally includes a low profile housing 14 having an optics arrangements 16 (FIG. 1) for facilitating projecting a liquid crystal image onto a remote viewing surface, such as a projection screen 60. A projection window 20 disposed in an upper or top front portion 34 of the housing 14 permits the liquid crystal image to pass upwardly into a top output mirror assembly 22 which reflects the image onto the remove viewing surface 60.

The liquid crystal image is formed by a liquid crystal display assembly 11 having a liquid crystal display panel 12 which is coupled electrically to a display controller 28 for controlling the formation of the liquid crystal image. The liquid crystal assembly 11 is mounted angularly inclined with the housing 14 to enable the housing 14 to have a low profile.

An ellipsoidal reflector lamp assembly 17 mounted at an upper rear portion of the housing 14 provides a source of high intensity light for passing through the liquid crystal display assembly 11. A set of mirrors, that will be described hereinafter, form part of the optics arrangement 16, direct light from the reflector lamp assembly 17, through the liquid crystal panel assembly 11, to the top output mirror assembly 22. In this regard, the optics arrangement 16 directs the high intensity light within the housing 14 along an irregularly shaped light path 18 extending angularly through the liquid crystal display panel 12 offset by an angle λ relative to the normal axis plane of the display panel 12 to help reduce image keystoning.

In operation, the projector unit 10 is positioned on a stationary surface, such as a table top 62 with a front portion 36 of the housing 14 disposed closest to the projection screen 60. The projector unit 10 is then connected to a source of power for energizing electrically the liquid crystal display assembly 11, the lamp assembly 17 and the display controller 28. A video signal source (not shown), such as personal computer, is coupled to the display controller 28 for enabling computer generated images to be produced by the display assembly 11. Light from the lamp assembly 17 is directed by the optics arrangement 16 along the irregularly shaped light path 18 which extends angularly through the liquid crystal panel 12 offset by λ degrees relative to the normal axis plane of the display panel 12. The optics arrangement 16 projects reflectively a liquid crystal image formed by the display panel 12 onto the remote viewing surface 60. To help reduce image keystoning, the image is projected reflectively upwardly at an angle θ relative to a horizontal imaginary line 59 substantially normal to the plane of the remote viewing surface 60, where the angle λ and the angle θ are substantially equal.

Considering now the liquid crystal display assembly 11 in greater detail with reference to FIGS. 1 and 2, the liquid crystal display assembly 11 generally includes a pair of Fresnel lens 13 and 15 mounted spaced apart from the liquid crystal display panel 12 for light converging and collimating purposes respectively. As best seen in FIG. 1, the panel 12 is mounted to a lower base portion 35 of the housing 14 and is inclined rearwardly from the perpendicular at about an angle (90 degrees −α). The angle α is selected to permit the liquid crystal image formed by the panel 12 to pass through the Fresnel lens 13 and to converge onto a top mirror assembly 42 forming part of the optics arrangement 16.

The Fresnel lens 15, is mounted below the liquid crystal panel 12 and substantially parallel with the panel 12. In this regard, the Fresnel lens 15 is mounted to the base portion 35, spaced apart from the panel 12, for collimating light reflecting from a bottom mirror assembly 41. The bottom mirror assembly 41 also forms part of the optics arrangement 16 and will be described hereinafter in greater detail.

Considering now the optics arrangement 16 in greater detail with reference to FIGS. 1 and 2, the optics arrangement 16 generally comprises a lens assembly 19 and a set of mirror assemblies including the bottom mirror assembly 41, the top mirror assembly 42, and a bottom output mirror assembly 43. The mirror assemblies 41–43 cooperated together to direct light reflecting from the lamp assembly 17 along an optical light path illustrated generally at 18 (FIG. 1), which extends through the liquid crystal panel 12 and the lens assembly 19.

Considering now the lamp assembly 17 in greater detail with reference to FIGS. 1–2, the lamp assembly 17 generally includes a lamp housing unit 50 which is mounted between the top portion 34 and a rear portion 37 of the housing 14. The lamp housing unit 50 is inclined or cocked downwardly from the vertical between about forty-five degrees and about fifty degrees. A more preferred angle is between about forty-six degrees and about forty-nine degrees. The most preferred angle is about 48.5°. As best seen in FIG. 2, an elliptical shaped reflector 52 extends between a right rear portion 53 and a left rear portion 54 of the housing unit 50.

The right and left portions 53 and 54 are mounted by means (not shown) to a right side member 38 and a left side member 39 of the housing 14. The reflector 52 collects light from one of either of two high intensity light bulbs 55 and 56 respectively. The lamp bulbs 55, 56 provide a primary source of light for the projector unit 10.

As best seen in FIG. 2, the bulb 55 is mounted to the right rear portion 53 of the housing unit 50, while the bulb 56 is mounted to the left rear portion 54 of the housing unit 50. Only one of the bulbs, such as the bulb 55, will be energized at any given time, while the other one of the bulbs, such as bulb 56 provides redundancy in the event the other bulb fails.

The lamp assembly 17 also includes a cold flip mirror 57 for reflecting cold light downwardly into the interior of the housing unit 14. Infrared light radiated by either of the bulbs 55, 56 is reflected into the mirror 57 which in turn, allows the infrared light to pass therethrough without reflection. In this regard, the mirror 57 reflects only cold light or light without any substantial infrared components. The mirror 57 is mounted pivotally and is disposed in one position as illustrated in FIG. 1 to receive light from bulb 56. In this regard, a central beam light (CLR56) strikes the mirror 57 at L and is reflected from there at a right angle along a central light ray axis (CLR57). A heat sink (not shown) disposed on the opposite side of the mirror 57 absorbs the ultraviolet radiation for helping to keep the temperature within the projector unit 10 at an acceptable level.

As bulb units 55 and 56 are substantially the same, only bulb unit 55 will be described in greater detail.

As best seen in FIG. 2, the bulb unit 55 is mounted pivotally to the right rear portion 53 of the lamp housing 50. A pivot arm 58 extends between the right rear portion 53 and the bulb unit 55. In this regard, the pivot arm 58 rotates downward pivotally to position the bulb unit 55 in a non-use position. The bulb unit 55 includes a high intensity light bulb 55A. The light bulb 55A is an FLK 410 watt bulb which is energized from a standard 110 volt (or 220 volt) alternating current source.

Considering now the lens assembly 19 in greater detail with reference to FIGS. 1 and 2, the lens assembly 19 generally includes a lens housing 21 mounted on a vertical axis V relative to the bottom wall 35 of the housing 14, and a set of adjustable projection lens 71–75 for helping to focus the projected image onto the projection screen 60. A lens cover assembly 80 covers the window 20 for protecting the lens assembly 19 when not in use.

Considering now the lens cover assembly 80 in greater detail, the lens cover assembly 80 generally includes a lens cover 81 mounted pivotally to the housing 14 by a pivot arm 83. In this regard, the pivot arm 83 permits a user to move the lens cover 81 from a closed position covering the window 20, to an opened position above the housing 14 and spaced apart from the top output mirror assembly 22.

Considering now the optics arrangement 16 and the light path 18 in greater detail with reference to FIGS. 1 and 2, the optical path 18 commences at one of the bulbs, such as the right bulb 56 for directing light along a central light ray axis CLR 56 horizontal towards the flip mirror 57 to the central point X on the flip mirror 57. From the flip mirror 57 light is reflected forwardly downwardly from the central point X of incidence of the flip mirror 57 at about an angle β along the central light ray axis CLR57 relative to a normal axis plane 25 of the bottom mirror assembly 41. The angle β is between about 31.3 degrees and about 52.3 degrees. A more preferred angle β is between about 37.3 degrees and about 43.3 degrees. The most preferred angle is about 42.3 degrees.

From the bottom mirror assembly 41, the optical path 18 extends angularly forwardly and upwardly at about an angle γ from a central point A of incidence along a central light ray axis CLR43 relative to a normal axis plane 27 of the top mirror assembly 42. The angle γ is between about 41.0 degrees and about 45.0 degrees. A more preferred angle γ is between about 42.0 degrees and about 44.0 degrees. The most preferred angle γ is about 43.0 degrees.

From the top mirror assembly 42 the optical path 18 extends angularly forwardly and downwardly from a central point B of incidence of the top mirror assembly 42 for reflecting light downwardly at about an angle δ along a central light ray axis CLR48 to a normal axis plane 29 of the output bottom mirror assembly 43. The angle δ is between about 72.9 degrees and about 76.9 degrees. A more preferred angle δ is between about 73.9 degrees and about 75.9 degrees. The most preferred angle δ is about 74.9 degrees.

Next, the optical path 18 extends upwardly from a central point C of incidence of the bottom output mirror assembly 43 for reflecting light forwardly and upwardly at about an angle φ along a central light ray axis CLR66 to a normal axis 31 of an output top mirror 24. The angle φ is between about 51 degrees and about 47 degrees. A more preferred angle φ is between about 50 degrees and about 48 degrees. The most preferred angle φ is about 49 degrees.

It should be noted the CLR66 extends through the lens assembly 19 at about an angle μ to the vertical axis V for keystone correction purposes. The angle μ is a keystone correction angle and is substantially equal to the angle θ and the angle λ.

Finally, the optical path 18 extends forwardly and upwardly from a central point D of incidence of the top output mirror 24 for reflecting light upwardly at about an angle θ along a central light ray axis CLR24 to a normal axis plane 59 of the remote screen or viewing surface 60. The angle θ is between about 1.5 degree and about 6.5 degrees. A more preferred angle θ is between about 2.5 degrees and about 5.5 degrees. The most preferred angle θ is about 4.5 degrees.

Considering now the bottom mirror assembly 41 in greater detail with reference to FIGS. 1 and 2, the bottom mirror assembly 41 generally includes a bottom mirror 43 and a mounting plate (not shown) for securing the bottom mirror 43 to the base portion 35 of the housing 14. The bottom mirror 43 is generally trapezoidal in shape, having a pair of spaced apart substantially parallel bottom and top members 44 and 45 respectively and a pair of spaced apart substantially non-parallel left and right side members 46 and 47 respectively. Bottom member 44 is substantially shorter than top member 45 and is disposed in close proximity to the lamp assembly 17. The top member 45 is disposed beneath and in close proximity to the liquid crystal panel 12 and is substantially wider than panel 12. Left side member 46 extends between a left terminal end portion of bottom member 44 and a left terminal end portion of top member 45. Side member 47 extends between a right terminal end portion of bottom member 44 and a right terminal end portion of top member 45.

As best seen in FIGS. 1 and 2, the bottom mirror 43 has a central point of incidence, indicated generally at A (FIG. 2), relative to the flip mirror 57. In this regard, the plane of the flip mirror 57 is disposed perpendicular to the plane of incidence of mirror 43. With mirrors 43 and 57 disposed in the above described relationship, the central light ray CLR 57 of the light reflecting from mirror 57 is directed horizontally downwardly toward the center of the housing 14 to strike mirror 43 at its central point of incidence A. The central light ray CLR 43 formed from the incidence light from mirror 57, reflects from mirror 43 perpendicularly toward a central point of incidence B of mirror 48. The angle of incidence of the central light ray CLR 43 relative to the angle of reflection of the central light ray CLR 57 is about 90 degrees.

As best seen in FIG. 1, an imaginary line 44 extending between the base of the housing 14 and the plane of the top mirror assembly 42 passes perpendicularly through the liquid crystal panel 12. Line 44 is offset from the central light ray CLR 43 by an angle λ in order to correct for keystoning. The angle λ is between about 1 degree and about 6 degrees. A more preferred angle λ is between about 2 degrees and about 5 degrees. The most preferred angle λ is about 4 degrees. From the foregoing, it should be understood the bottom mirror 43 introduces the offset to correct for keystoning in the projected liquid crystal image.

Considering now the top mirror assembly 42 in greater detail with reference to FIGS. 1 and 2, the top mirror assembly generally includes a top mirror 48 and a top mirror mounting unit 49 for securing the top mirror 48 to a top portion 34 of the housing 14.

As best seen in FIG. 2, the top mirror 48 is generally rectangular in shape having a pair of front and rear edges 62 and 63 respectively and a pair of right and left side edges 64 and 65 respectively (FIG. 2). The plane of the top mirror 48 is disposed inclined downwardly from the horizontal at about an angle η. In this regard, the rear edge 63 is lower than the front edge 62. The angle η is between about 3 degrees and about 8 degrees. A more preferred angle η is between about 4 degrees and about 7 degrees. The most preferred angle η is about 6 degrees.

Considering now the bottom output mirror assembly 43 in greater detail with reference to FIGS. 1 and 2, the bottom output mirror assembly generally includes a bottom output mirror 66 and a mirror housing (not shown) for securing the mirror 66 angularly between the front 36 and bottom portions 35 of the housing 14.

The bottom output mirror 66 is generally rectangular in shape and includes a front edge 67, a rear edge 68 and right and left side edges 69 and 70 respectively.

In order to permit light reflected from mirror 48 to be reflected via the bottom output mirror 66 through the lens assembly 21, the bottom output mirror 66 is mounted with the front edge 67 disposed higher than the rear edge 68. In this regard, the mirror 66 is mounted at about an angle ε relative to the horizontal. The angle ε is between about 23.25 degrees and about 27.25 degrees. A more preferred angle ε is between about 24.25 degrees and about 26.25 degrees. The most preferred angle ε is about 25.25 degrees.

Considering now the top output mirror assembly 22 in greater detail, the top output mirror assembly 22 generally includes a top output mirror 24 for reflecting light towards the projection screen 60 and a mirror housing 26 for securing the mirror 24 to the housing 14. A pivot arm 23 mounted to an upper portion of the housing 14 extends to the mirror housing 26. In this regard, a user can raise the top output mirror 24 pivotally from a closed position substantially parallel to the front wall 36 of the housing 14, to an opened position substantially above the top wall 34 of the housing 14.

A recess 36A in the front wall 36 enables a user to grasp the mirror housing 26 so it may be pivoted upwardly to its reflecting position as illustrated in FIG. 1.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A projector, comprising:

a housing having a low height for facilitating storage and transportation of the projector in a compact low profile configuration;

said housing having a front portion a rear portion, a top portion, and a bottom portion for helping to define the limits of an optical path disposed within said housing;

liquid crystal display means mounted angularly extending between said top portion and said bottom portion to permit said display means to fit within said housing for forming a large liquid crystal image to facilitate the projection thereof along a portion of said optical path;

said liquid crystal display means having a height and width dimension, said height dimension being substantially greater than the height of said housing to help facilitate the projection of said large liquid crystal display image;

means defining a generally horizontal optical path from the rear portion of said housing to the front portion of said housing;

said liquid crystal display means being disposed within said optical path for passing high intensity light therethrough in a generally forward direction along said optical path;

lens means mounted on said housing for focusing said liquid crystal display image and for reflecting the focused display image in a generally upwardly forward direction onto said remote viewing surface;

said lens means mounted substantially entirely within said housing forward of said display means to protect said lens means within said housing;

top mirror means mounted within said housing forwardly of said display means for reflecting the illuminated liquid crystal display image downwardly and forwardly along said optical path toward said front portion to help facilitate the projection of the illuminated image onto a remote viewing surface;

bottom mirror means mounted within said housing forwardly of said top mirror means for reflecting the reflected illuminated display image upwardly along said optical path toward said lens means to permit the reflected display image to be focused and projected onto said remote viewing surface; and illumination means mounted in the rear portion of said housing for producing the high intensity light to illuminate the optical path and the liquid crystal display image.

2. A projector according to claim 1, wherein said liquid crystal display means is a single liquid crystal display panel assembly.

3. A projector according to claim 2, wherein said housing includes a housing output window for passing the projected liquid crystal image; and wherein said optics means includes exterior mirror means mounted adjustably relative to the housing output window for helping to position the projected liquid crystal image onto said remote viewing surface.

4. A projector according to claim 3, wherein said exterior mirror means is mounted pivotally for reflecting the liquid crystal display image upwardly from a horizontal plane toward said remote viewing surface.

5. A projector according to claim 4, wherein said optic means includes lower output mirror means disposed within said optical path for directing said liquid crystal image substantially vertically upwardly through said output window.

6. A projector according to claim 5, wherein said lens means is disposed in said optical path between said output mirror means and said output window for helping to focus the liquid crystal image for image projection purposes.

7. A projector according to claim 6, wherein said exterior mirror means is adjustable between a fully opened position and a fully closed position.

8. A projector according to claim 7, wherein said exterior mirror means is disposed angularly inclined upwardly relative to the horizontal plane of said housing when disposed in said fully opened position.

9. A projector according to claim 8, wherein said exterior mirror means is disposed in a substantially perpendicular position relative to the horizontal plane of said housing when disposed in said fully closed position.

10. A projector according to claim 1, wherein said housing includes a window mounted in the top portion thereof for permitting the focused image to pass therethrough so it can be projected onto said remote viewing surface.

11. A projector according to claim 10, further comprising output mirror means mounted externally on said housing opposite said window for reflecting the focused display image along an external optical path disposed outside of said housing toward said remote viewing surface.

12. A projector according to claim 1, further comprising rear mirror means mounted in said housing rearward of said display means for reflecting high intensity light in a generally upwardly forwardly direction along said optical path toward said display means illuminating it to facilitate projection of a liquid crystal display image along said optical path.

* * * * *

UNITED STATES PATENT AND TRADEMARK OFFICE
CERTIFICATE OF CORRECTION

PATENT NO. : 5,453,803
DATED : 09-26-95
INVENTOR(S) : Leonid Shapiro and David W. Kappel It is certified that error appears in the above-indentified patent and that said Letters Patent is hereby corrected as shown below:

Column 7, line 18, after "front portion", insert --,--.

Signed and Sealed this

Tenth Day of December, 1996

*Attest:*

BRUCE LEHMAN

*Attesting Officer*     *Commissioner of Patents and Trademarks*